(12) United States Patent
Gast

(10) Patent No.: US 10,231,180 B2
(45) Date of Patent: Mar. 12, 2019

(54) HYBRID LOW POWER NETWORK DEVICE

(71) Applicant: Aerohive Networks, Inc., Milpitas, CA (US)

(72) Inventor: Matthew Stuart Gast, San Francisco, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

(21) Appl. No.: 15/816,891

(22) Filed: Nov. 17, 2017

(65) Prior Publication Data

US 2018/0084494 A1 Mar. 22, 2018

Related U.S. Application Data

(63) Continuation of application No. 14/951,395, filed on Nov. 24, 2015, now Pat. No. 9,826,479.

(60) Provisional application No. 62/241,080, filed on Oct. 13, 2015.

(51) Int. Cl.
*H04W 52/02* (2009.01)
*H04W 52/34* (2009.01)
*H04W 88/10* (2009.01)

(52) U.S. Cl.
CPC ... *H04W 52/0212* (2013.01); *H04W 52/0206* (2013.01); *H04W 52/34* (2013.01); *H04W 88/10* (2013.01); *Y02B 60/50* (2013.01); *Y02D 70/00* (2018.01); *Y02D 70/142* (2018.01)

(58) Field of Classification Search
CPC ......... H04W 52/0212; H04W 52/0206; H04W 52/34; H04W 88/10
See application file for complete search history.

(56) References Cited

U.S. PATENT DOCUMENTS

| | | |
|---|---|---|
| 2008/0253328 A1 | 10/2008 | Sahinoglu |
| 2010/0296487 A1 | 11/2010 | Karaoguz |
| 2012/0195329 A1 | 8/2012 | Thelen |
| 2013/0003746 A1 | 1/2013 | Klein |
| 2014/0313901 A1 | 10/2014 | Yacovitch |
| 2015/0230231 A1 | 8/2015 | Fornoles |

OTHER PUBLICATIONS

International Application No. PCT/US2016/056896, International Search Report and Written Opinion dated Jan. 10, 2017.

(Continued)

*Primary Examiner* — Bo Hui A Zhu
(74) *Attorney, Agent, or Firm* — Sheppard, Mullin, Richter & Hampton LLP

(57) ABSTRACT

A hybrid low power network device comprising: a wave 1 radio configured to provide client devices wireless access to a network using SU-MIMO, a wave 2 radio configured to provide the client devices wireless access to the network using MU-MIMO, a radio management system configured to assign client devices to either the wave 1 radio or the wave 2 radio for communicating over wireless communication channels in accessing the network, first and second Ethernet ports, wherein at least one of the first and second Ethernet ports are configured to provide power to the hybrid low power network device and allow at least one of the wave 1 radio and the wave 2 radio to communicate with the network, in operation the hybrid low power network device is configured to operate at a power consumption level between 15 and 17 W in providing the client devices wireless access to the network.

19 Claims, 6 Drawing Sheets

(56) References Cited

OTHER PUBLICATIONS

European Patent Application No. 16856212.2, Search Report dated Aug. 23, 2018.
Cisco Systems, Inc., "Cisco Wireless Controller Configuration Guide," Release 7.0.98.0, Jun. 2010 [retrieved online at https://www.cisco.com/c/en/us/td/docs/wireless/controller/7-0/configuration/guide/c70.pdf on Aug. 15, 2018].

HYBRID LOW POWER NETWORK DEVICE

CROSS REFERENCE TO RELATED APPLICATIONS

This application is a continuation of U.S. patent application Ser. No. 14/951,395, filed Nov. 24, 2015, which claims priority to U.S. Provisional Patent Application No. 62/241,080, filed Oct. 13, 2015, both of which are incorporated by reference herein.

BACKGROUND

An area of ongoing research and development is access points. In particular multi-user multi-input multi-output ("MU-MIMO") access points have been developed. MU-MIMO access points consume more power than single-user multi-input multi-output ("SU-MIMO") access points.

There therefore exists a need for MU-MIMO configured access points operating at lower power consumption levels.

The foregoing examples of the related art and limitations related therewith are intended to be illustrative and not exclusive. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include a hybrid low power network device.

In various implementations, a hybrid low power network device comprises a wave 1 radio configured to provide client devices wireless access to a network using SU-MIMO. Further, in various implementations, a hybrid low power network device comprises a wave 2 radio configured to provide the client devices wireless access to the network using MU-MIMO. In various implementations, a hybrid low power network devices comprises a radio management system configured to assign the client devices to either the wave 1 radio or the wave 2 radio for communicating over wireless communication channels in accessing the network. Additionally, in various implementations, a hybrid low power network device comprises first and second Ethernet ports, wherein at least one of the first and second Ethernet ports are configured to provide power to the hybrid low power network device and allow at least one of the wave 1 radio and the wave 2 radio to communicate with the network. In various implementations, in operation, a hybrid low power network device is configured to operate at a power consumption level between 15 and 17 W in providing the client devices wireless access to the network.

These and other advantages will become apparent to those skilled in the relevant art upon a reading of the following descriptions and a study of the several examples of the drawings.

DETAILED DESCRIPTION

Figure 1:
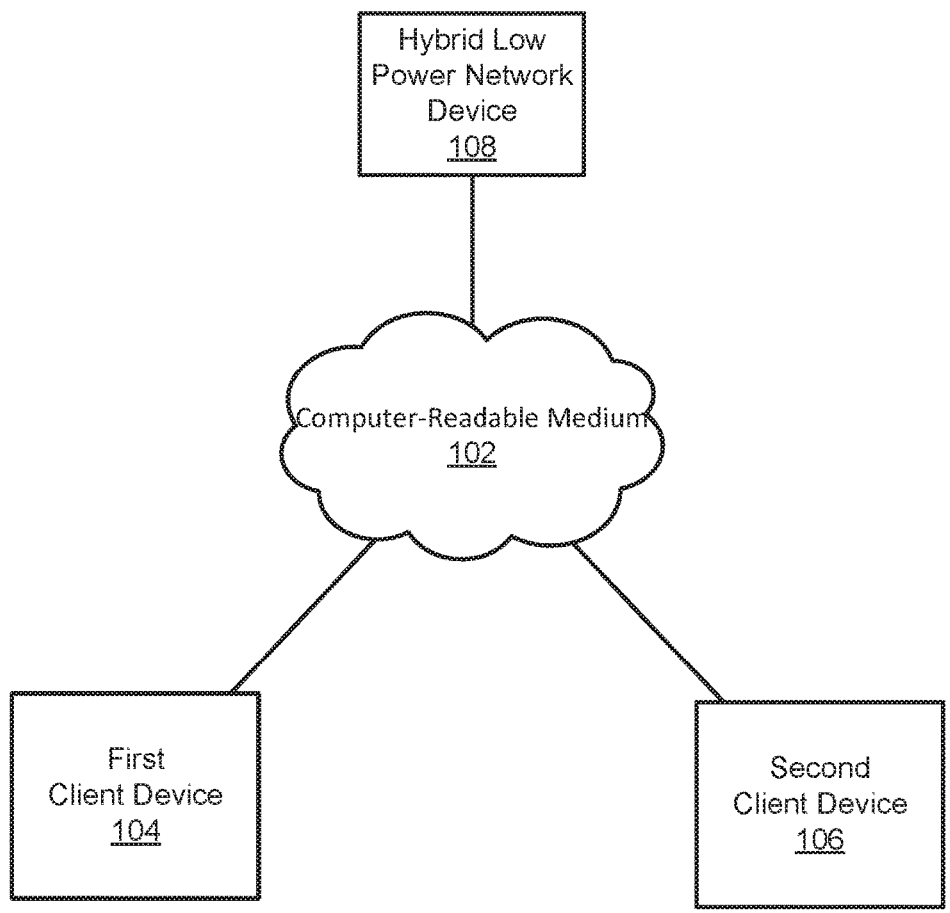
FIG. 1 depicts a diagram of a system for providing wireless access to a plurality of client devices using a hybrid low power network device.

FIG. 1 depicts a diagram 100 of a system for providing wireless access to a plurality of client devices using a hybrid low power network device. The example system shown in FIG. 1 includes a computer-readable medium 102, a first client device 104, a second client device 106, and a hybrid low power network device 108.

In the example system shown in FIG. 1, the first client device 104, the second client device 106, and the hybrid low power network device 108 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the first client device 104, the second client device 106, the hybrid low power network device 108, and other applicable systems or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, Ethernet interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the hybrid low power network device 108 is coupled through a Wi-Fi connection to the first client device 104 and the second client device 106, which act as or include a station. A station, as used in this paper, can be referred to as a device with a media access control (MAC) address and a physical layer (PHY) interface to a wireless medium that complies with the IEEE 802.11 standard. Thus, for example, the first client device 104 and the second client device 106 can be referred to as stations, if applicable. IEEE 802.11a-1999, IEEE 802.11b-1999, IEEE 802.11g-2003, IEEE 802.11-2007, IEEE 802.11n TGn Draft 8.0 (2009), and IEEE 802.11ac-2013 are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the hybrid low power network device 108 is compliant with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, either or both the first client device 104 and the second client device 106 are configured to receive data wirelessly through a wireless connection established and maintained using MU-MIMO. Depending upon implementation-specific or other considerations, when the first client device 104 and the second client device 106 are both configured to receive data through wireless connections established and maintained using MU-MIMO, the first client device 104 and the second client device 106 can be differentiated, e.g. for purposes of transmitting wireless signals to the first client device 104 and the second client device 106, based on corresponding spatial signatures of the first client device 104 and the second client device 106. As a result, the first client device 104 and the second client device 106 can simultaneously access the same wireless channel. In various implementations, the first client device 104 and the second client device 106 include one or a plurality of antennas for communicating over a wireless connection.

The hybrid low power network device 108 functions according to an applicable network device for providing network access to client devices through a wireless connection. In providing network access to client devices, the hybrid low power network device 108 can establish and maintain a wireless connection with the client devices. In establishing and maintaining a wireless connection with client devices, the hybrid low power network device 108 can transmit data to the client devices and receive data from the client devices.

The hybrid low power network device 108 is configured to provide network access through wireless connections using either or both MU-MIMO and SU-MIMO. The hybrid low power network device 108 is "hybrid" in that it can provide network access through wireless connections using either MU-MIMO or SU-MIMO. Depending upon implementation-specific or other considerations, the hybrid low power network device 108 can provide network access through wireless connections simultaneously to a plurality of client devices using both MU-MIMO and SU-MIMO. For example, the hybrid low power network device 108 can provide access to a network for a first client device through a first wireless connection established and maintained using MU-MIMO and provide access to the network for a second client device through a second wireless connection established and maintained using SU-MIMO. Further depending upon implementation-specific or other considerations, the hybrid low power network device 108 provides network access through wireless connections simultaneously to a plurality of client devices using MU-MIMO. For example, the hybrid low power network device 108 can provide access to a network for a first client device through a first wireless connection established and maintained using MU-MIMO and provide access to the network for a second client device through a second wireless connection established and maintained using MU-MIMO. In providing network access through wireless connections using MU-MIMO, the hybrid low power network device 108 can transmit data to client devices according to applicable methods for providing MU-MIMO access to client devices, such as the methods discussed in IEEE 802.11ac-2013.

The hybrid low power network device 108 includes a first radio configured to provide access to a network using SU-MIMO and a second radio configured to provide access to a network using MU-MIMO. A second radio included as part of the hybrid low power network device 108 and configured to provide access to a network using MU-MIMO can function according to an applicable 802.11ac wave 2 radio for transmitting and receiving data through a wireless connection. A first radio included as part of the hybrid low power network device 108 and configured to provide access to a network using SU-MIMO can function according to an applicable radio for transmitting and receiving data wirelessly according to SU-MIMO. As used in this paper, a wave 1 radio is a radio configured to provide access to a network through a wireless communication channel using SU-MIMO. Further, as used in this paper, a wave 2 radio is a radio configured to provide access to a network through a wireless communication channel using MU-MIMO.

Depending upon implementation-specific or other considerations, a first radio included as part of the hybrid low power network device 108 can be configured to operate within the 2.4 GHz band.

In a specific implementation, the hybrid low power network device 108 operates at an energy consumption rate beneath or equal to 17 W. Depending upon implementation-specific or other considerations, the hybrid low power network device 108 operates at an energy consumption rate beneath the IEEE 802.3af power over Ethernet limit, e.g. around 15.5 W. In operating at an energy consumption rate beneath or equal to 17 W, the hybrid low power network device 108 can control operation of components within the hybrid low power network device 108 to maintain an energy consumption rate beneath or equal to 17 W. For example, the hybrid low power network device 108 can disable an Ethernet port included as part of components within the hybrid low power network device 108 to achieve a power consumption level beneath or equal to 17 W.

In a specific implementation, the hybrid low power network device 108 is configured to manage data transmission and reception of radios included as part of the hybrid low power network device 108. Depending upon implementation-specific or other considerations, in managing data transmission and reception, the hybrid low power network device 108 assigns client devices to a radio in establishing and maintaining a wireless connection with the client devices. For example, the hybrid low power network device 108 can assign a radio configured to provide network access through MU-MIMO to communicate with specific client devices. Further depending upon implementation-specific or other considerations, in managing data transmission and reception of radios included as part of the hybrid low power network device 108, the hybrid low power network device 108 assigns what data is to be transmitted and received by which radio in establishing and maintain a wireless connection. For example, the hybrid low power network device 108 can assign a specific radio to send data related to establishing a wireless connection with the hybrid low power network device 108.

In a specific implementation, the hybrid low power network device 108 is configured to manage data transmission and reception of radios included as part of the hybrid low power network device 108 based on device characteristics of client devices accessing the network through the hybrid low power network device 108. As used in this paper, device characteristics of client devices include applicable parameters related to accessing a network through a wireless connection. Example device characteristics of client devices include device type, whether a device is configured for MU-MIMO operation, and security of a client device. In an example of operations, the hybrid low power network device 108 can assign a wave 2 radio to provide access to a network through a wireless connection to a specific client device if the client device is configured to access a network using MU-MIMO. In another example of operation, the hybrid low power network device 108 can assign a wave 1 radio to provide access to a network through a wireless connection to a specific client device if the specific client device only has a single antenna for sending and receiving data.

In a specific implementation, the hybrid low power network device 108 is configured to manage data transmission and reception of radios included as part of the hybrid low power network device 108 based on network traffic characteristics of the hybrid low power network device 108. As used in this paper, network traffic characteristics of the hybrid low power network device 108 include applicable parameters related to providing network access by the hybrid low power network device 108. Example network traffic characteristics include used network bandwidth, a number of client devices the hybrid low power network device 108 is providing network access to, and a number of data streams supported by the hybrid low power network device 108. In an example of operation, if a radio supports three data streams, and it is found that the radio is only currently supporting two data streams, then the hybrid low power network device 108 can assign the radio to serve another client device.

In a specific implementation, the hybrid low power network device 108 is configured to manage data transmission and reception of radios included as part of the hybrid low power network device 108 based on data characteristics of data transmitted to and/or received from a client device accessing the network through the hybrid low power network device 108. As used in this paper, data characteristics of data can include applicable parameters describing data transmitted from and received by the hybrid low power network device 108 in providing access to a network. For example, data characteristics of data can include a source of data, a data type of data, and a size of data. In an example of operation, if it is determined that voice data is being transmitted to or received by the hybrid low power network device 108, then the hybrid low power network device 108 can assign a wave 2 radio to serve the data. In another example of operation, if it is determined that data is being transmitted to or received by the hybrid low power network device 108 from an untrusted source, then the hybrid low power network device 108 can assign a wave 1 radio to serve the data.

In a specific implementation, the hybrid low power network device 108 is configured to manage data transmission and reception of radios included as part of the hybrid low power network device 108 based on power consumption levels of the hybrid low power network device 108. For example if the hybrid low power network device 108 is consuming power at a level that is approaching a threshold power consumption level, e.g. 17 W, then the hybrid low power network device 108 can assign client devices assigned to a first radio, e.g. a wave 2 radio, to a second radio, e.g. a wave 1 radio. As wave 1 radios operate at lower power levels when compared to wave 2 radios, the overall power consumption level of the hybrid low power network device 108 is decreased.

In an example of operation of the example system shown in FIG. 1, the first client device 104 is configured to access a network through a wireless connection using SU-MIMO. In the example of operation of the example system shown in FIG. 1, the second client device 106 is configured to access the network through a wireless connection using MU-MIMO. Further, in the example of operation of the example system shown in FIG. 1, the hybrid low power network device 108 provides access for the first client device 104 to the network through a wave 1 radio using SU-MIMO and provides access for the second client device 106 to the network through a wave 2 radio using MU-MIMO.

Figure 2:
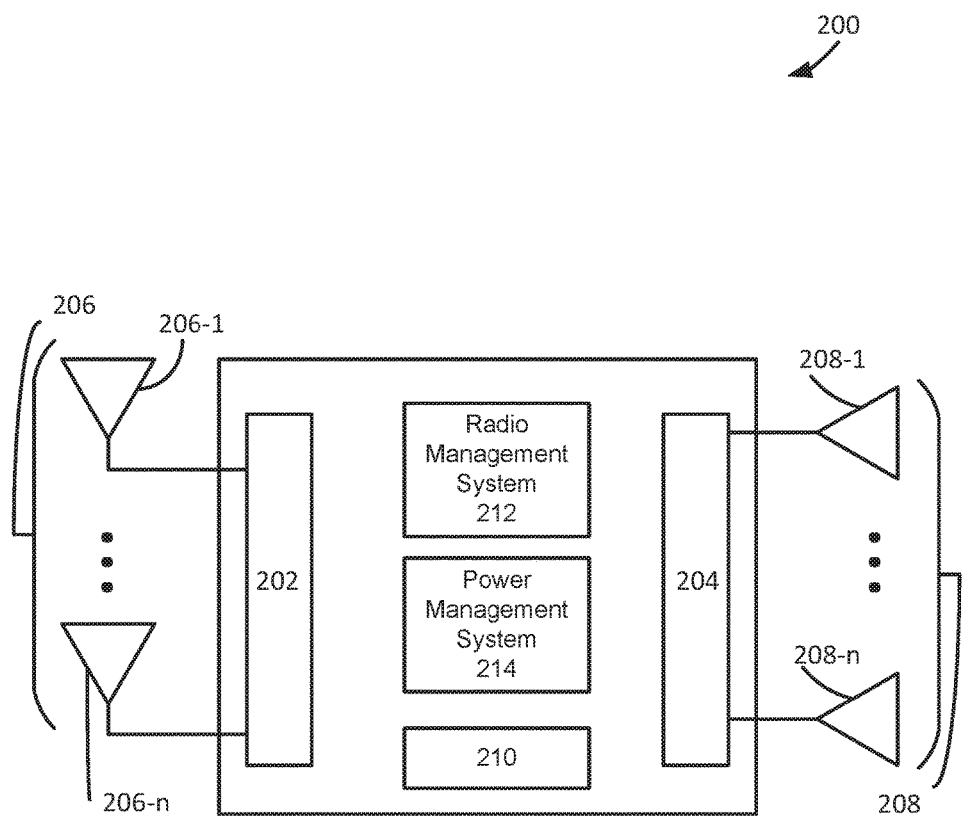
FIG. 2 depicts an example diagram of a hybrid low power network device.

FIG. 2 depicts an example diagram 200 of a hybrid low power network device. The hybrid low power network device shown in FIG. 2 includes a wave 1 radio 202 and a wave 2 radio module 204. The wave 1 radio 202 functions according to an applicable radio for providing a client device access to a network through a wireless communication channel using SU-MIMO. Depending upon implementation-specific or other considerations, the wave 1 radio 202 can transmit and receive data according to SU-MIMO for a plurality of client devices. The wave 2 radio 204 functions according to an applicable radio for providing a client device access to a network through a wireless communication channel using MU-MIMO. Depending upon implementation-specific or other considerations, the wave 2 radio 204 can transmit and receive data according to MU-MIMO for a plurality of client devices simultaneously.

In a specific implementation, the wave 1 radio 202 is configured to selectively operate within the 2.4 GHz frequency band or the 5 GHz frequency band. The wave 1 radio 202 can operate using 256 quadrature amplitude modulation (QAM). In various implementations, the wave 1 radio 202 operates within a channel width of 80 MHz and supports 3 spatial streams. Further, in various implementations, the wave 1 radio 202 operates at a PHY rate of 600 Mbps.

In a specific implementation, the wave 2 radio 204 operates within the 5 GHz frequency band. The wave 2 radio 204 can operate using 256 QAM. In various implementations, the wave 2 radio 204 operates within a channel width of 160 MHz and supports 4 spatial streams. Further, in various implementations, the wave 2 radio 204 operates at a PHY rate of 2.34 Gbps to 3.47 Gbps.

The hybrid low power network device shown in FIG. 2 includes a first antenna array 206 and a second antenna array 208. The first antenna array 206 is comprised of antennas 206-1 . . . 206-$n$ and the second antenna array 208 is comprised of antennas 208-1 . . . 208-$n$. The first antenna array 206 and the second antenna array can be comprised of an applicable number of antennas for transmitting data to and receiving data from clients in providing network access through a wireless communication channel. The first antenna array 206 is associated with the wave 1 radio 202 and is used in transmitting and receiving signal according to SU-MIMO. The second antenna array 208 is associated with the wave 2 radio 204 and is used in transmitting and receiving signals according to MU-MIMO.

In a specific implementation, antennas forming the first antenna array 206 are of the same polarization and antennas forming the second antenna array 208 are of the same polarization. For example, antennas forming the first antenna array 206 can all be either vertically polarized or horizontally polarized with respect to the hybrid low power network device. In another example, antennas forming the second antenna array 208 can all be either vertically polarized or horizontally polarized with respect to the hybrid low power network device.

In a specific implementation, antennas forming the first antenna array 206 are orthogonally polarized with respect to the antennas forming the second antenna array 208. As a result, the wave 1 radio 202 and the wave 2 radio 204 utilize corresponding polarized antennas that have a 90° phase offset from each other. For example, the first antenna array 206 can be formed by vertically polarized antennas that are positioned to have a +45° phase offset with respect to a center of the hybrid low power network device, while the second antenna array 208 can be formed by horizontally polarized antennas that are positioned to have a −45° phase offset with respect to the center of hybrid low power network device, thereby leading to a 90° phase offset between the antennas forming the first antenna array 206 and the antennas forming the second antenna array 208. While in the previous example, antenna position and phase offsets is discussed with respect to a center of the hybrid low power network device, positions and phase offsets of antennas forming the first antenna array 206 and antennas forming the second antenna array 208 can be with reference to an applicable point, axis, or plane within or in an environment surrounding the hybrid low power network device as long as the antennas forming the first antenna array 206 and the antennas forming the second antenna array 208 are orthogonally polarized with respect to each other. Due to orthogonal polarization between antennas forming the first antenna array 206 and antennas forming the second antenna array 208, at least 40 dB of antenna isolation can be achieved between the antennas forming the first antenna array 206 and the antennas forming the second antenna array 208.

The hybrid low power network device shown in FIG. 2 includes first and second Ethernet ports 210. Either or both of the first and second Ethernet ports 210 can be used to provide power to the hybrid low power network device. Either or both of the first and second Ethernet ports can be used to transmit data to and from the hybrid low power network device in providing access to a network.

The hybrid low power network device shown in FIG. 2 includes a radio management system 212 and a power management system 214. The radio management system 212 functions to manage the wave 1 radio 202 and the wave 2 radio 204 of the hybrid low power network device. In managing the radios of the hybrid low power network device, the radio management system 212 can assign client devices for the radios to specifically communicate with in providing network access through a wireless communication channel to the client devices. For example, the radio management system 212 can assign a first client device to the wave 1 radio 202 and a second client device to the wave 2 radio 204. Depending upon implementation-specific or other considerations, the radio management system 212 can assign client devices to the wave 1 radio 202 and the wave 2 radio 204 based on device characteristics of the client devices, network traffic characteristics of the hybrid low power network device, and/or data characteristics of data transmitted to and/or from the client devices. Further depending upon implementation-specific or other considerations, the radio management system 212 can assign client device to the wave 1 radio 202 and the wave 2 radio 204 based on power consumption levels of the hybrid low power network device.

The power management system 214 functions to manage power consumption of the hybrid low power network device. In managing power consumption of a hybrid low power network device, the power management system 214 can determine how much power is being consumed by components of the hybrid low power network device at any given time. For example, the power management system 214 can determine that the wave 1 radio 202 is consuming 15 W while the wave 2 radio 204 is consuming 17 W. Further, in managing power consumption of a hybrid low power network device, the power management system 214 can control operation of components of the hybrid low power network device according to power consumption levels of the hybrid low power network device. For example, the power management system 214 can disable one of the first and second Ethernet ports 210 if the hybrid low power network device is consuming power above a threshold power consumption level.

In a specific implementation, the hybrid low power network device shown in FIG. 2 operates within the 802.3af power over Ethernet limit. For example, the hybrid low power network device can be configured to operate beneath around 15.5 W. In various implementations, the radio management system 212, the power management system 214, and associated computer systems, in operation, consume between 6 to 8 W. In various implementations, the wave 1 radio 202, in operation, consumes between 3.5 to 4 W. In various implementations, the wave 2 radio 204, in operation, consumes between 4 to 5 W. In various implementations, each of the first and second Ethernet ports 210, in operation, consumes between 0.5 to 1 W.

Figure 3:
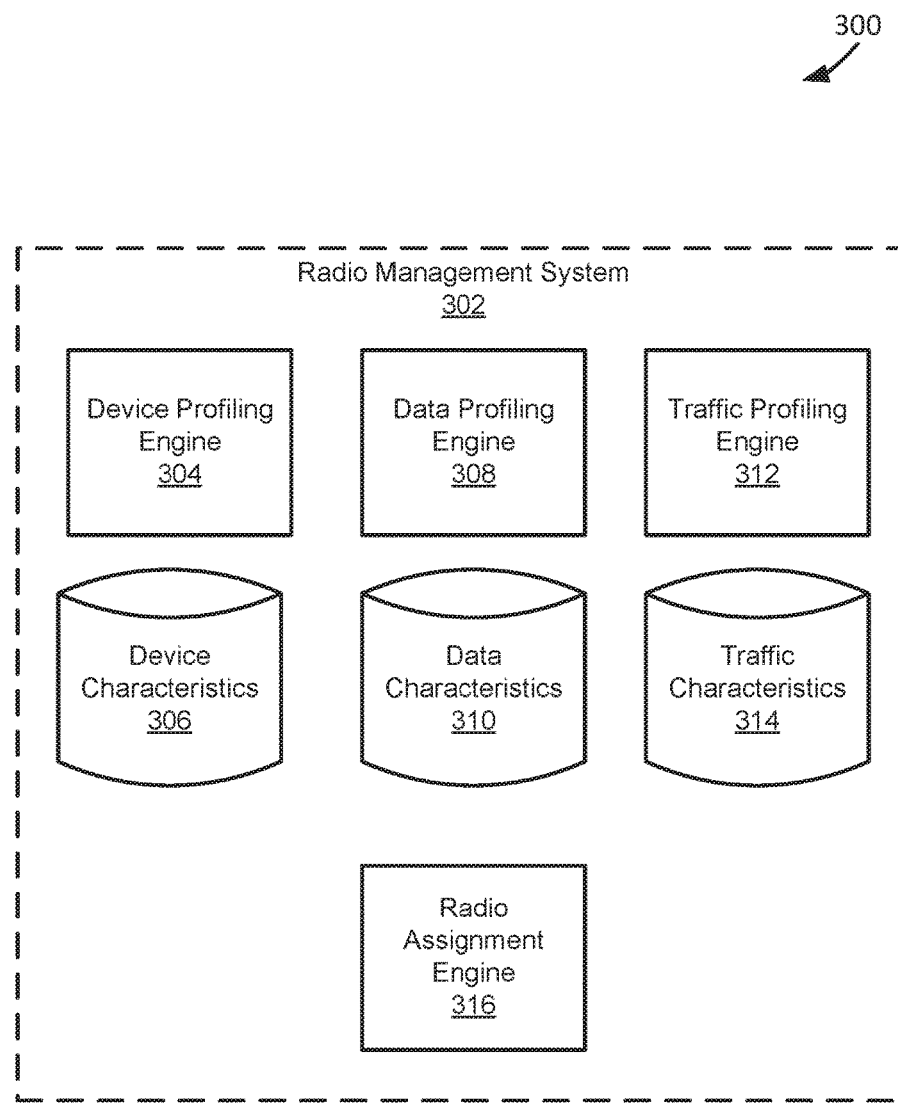
FIG. 3 depicts a diagram of an example of a system for managing radios in a hybrid low power network device.

FIG. 3 depicts a diagram 300 of an example of a system for managing radios in a hybrid low power network device. The system shown in FIG. 3 includes a radio management system 302. The radio management system 302 functions according to an applicable system for managing radios within a hybrid low power network device, such as the radio management systems described in this paper. In managing radios within a hybrid low power network device, the radio management system 302 can assign client devices to radios for providing the client devices access to a network. Depending upon implementation-specific or other considerations, the radio management system 302 can assign client devices to radios based on device characteristics of the client devices, data characteristics of data transmitted to and from the client devices, and network traffic characteristics.

The example radio management system 302 shown in FIG. 3 includes a device profiling engine 304, a device characteristics datastore 306, a data profiling engine 308, a data characteristics datastore 310, a traffic profiling engine 312, a traffic characteristics datastore 314, and a radio assignment engine 316. The device profiling engine 304 functions to profile device characteristics of a client device. In profiling device characteristics of a client device, the device profiling engine 304 can determine device characteristics of a client device and create device characteristics data indicating the determined device characteristics. For example, the device profiling engine 304 can determine that a client device is capable of receiving data transmitted through MU-MIMO and generate device characteristics data indicating that the client device is capable of receiving data transmitted through MU-MIMO. Depending upon implementation-specific or other considerations, the device profiling engine 304 can determine device characteristics of a client device based on data transmitted to the client device. For example, if voice data if video data is transmitted to a client device, the device profiling engine 304 can determine that a client device is a tablet. Further depending upon implementation-specific or other considerations, the device profiling engine 304 can determine device characteristics of a client device based on whether the client device is a bring your own device or an entity device. For example, if the device profiling engine 304 discovers that a client device is a bring your own device, then the device profiling engine 304 can determine that the client device does not comply with the security policies of a network of an entity.

In a specific implementation, the device profiling engine 304 functions to continually determine device characteristics of a device during multiple sessions the client device has in accessing a network. For example, the device profiling engine 304 can determine that a client device is capable of receiving data transmitted through MU-MIMO in a subsequent session and update device characteristics data to indicate the client device is capable of communicating with a wave 2 radio according to MU-MIMO.

The device characteristics datastore 306 functions to store device characteristics data indicating device characteristics of a client device. The device characteristics datastore 306 can store device characteristics data that is updated and modified as a client device accesses a network during multiple sessions. In various implementations, device characteristics data stored in the device characteristics datastore 306 can be used to determine which radio of a hybrid low power network device to assign to communicate with a client device in providing access for the client device to a network. For example, device characteristics data stored in the device characteristics datastore 306 can be used to determine whether to assign a client device to a wave 2 radio for communicating with in accessing a network.

The data profiling engine 308 functions to profile data transmitted to and from a client device in accessing a network. In profiling data transmitted to a client device, the data profiling engine 308 can determine data characteristics of data transmitted to and from a client device and create data characteristics data indicating the determined data characteristics. For example, the data profiling engine 308 can determine that a client device is receiving voice data. In another example, the data profiling engine 308 can determine that a client device is transmitting voice data.

In a specific implementation, the data profiling engine 308 functions to continually determine data characteristics of data transmitted to and from a plurality of client devices during multiple sessions the client devices have in accessing a network. For example, the data profiling engine 308 can determine that a first client device is receiving streaming video data during a first session and that a second client device is receiving webpage data during a second session.

The data characteristics datastore 310 functions to store data characteristics data indicating data characteristics of data transmitted to and from a client device. The data characteristics datastore 310 can store data characteristics data that is updated and modified as a plurality of client devices access a network during multiple sessions. In various implementations, data characteristics data stored in the data characteristics datastore 310 can be used to determine which radio of a hybrid low power network device to assign to communicate with a client device in providing access for the client device to a network. For example, data characteristics data stored in the data characteristics datastore 310 can be used to determine whether to assign a client device to a wave 2 radio for communicating with in accessing a network.

The traffic profiling engine 312 functions to profile network traffic of a hybrid low power network device. In profiling network traffic of a hybrid low power network device, the traffic profiling engine 312 can determine network traffic characteristics related to the hybrid low power network device and create traffic characteristics data indicating the determined network traffic characteristics. For example, the traffic profiling engine 312 can determine that a wave 2 radio included as part of a low power hybrid network device is communicating with four separate client devices. In another example, the traffic profiling engine 312 can determine that a hybrid low power network device is supporting 8 data streams.

In a specific implementation, the traffic profiling engine 312 functions to continually determine network traffic characteristics of a hybrid low power network device. For example, the traffic profiling engine 312 can determine that a hybrid low power network device is initially supporting 8 data streams and then is supporting 7 data streams after a client device ends a session.

The traffic characteristics datastore 314 functions to store traffic characteristics data indicating network traffic characteristics of a hybrid low power network device. The traffic characteristics datastore 314 can store traffic characteristics data that is updated and modified as a plurality of client devices access a network through a hybrid low power network device during multiple sessions. In various implementations, traffic characteristics data stored in the traffic characteristics datastore 314 can be used to determine which radio of a hybrid low power network device to assign to communicate with a client device in providing access for the client device to a network. For example, traffic characteristics data stored in the traffic characteristics datastore 314 can be used to determine whether to assign a client device to a wave 2 radio for communicating with in accessing a network.

The radio assignment engine 316 functions to assign a client device to a radio of a hybrid low power network device to communicate with in accessing a network. Depending upon implementation-specific or other considerations, the radio assignment engine 316 can assign a client device to communicate with a wave 1 radio of a hybrid low power network device or a wave 2 radio of the hybrid low power network device. Further depending upon implementation-specific or other considerations, the radio assignment engine 316 can switch a radio assignment of a client device during a session. For example, the radio assignment engine 316 can initially assign a client device to a wave 2 radio of a hybrid low power network device and then switch assignment of the client device to a wave 1 radio of the hybrid low power network device, during a session of the client device.

In a specific implementation, the radio assignment engine 316 assigns a client device to a radio of a hybrid low power network device for accessing a network based on device characteristics of the client device. The radio assignment engine 316 can use device characteristics data describing device characteristics of a client device to assign the client device to a radio of a hybrid low power network device. For example, if device characteristics of a client device indicate that the client device is configured to receive data through MU-MIMO, then the radio assignment engine 316 can assign the client device to a wave 2 radio of a hybrid low power network device in accessing a network. In another example, if device characteristics of a client device indicate that the client device is configured to send and receive data only through SU-MIMO, then the radio assignment engine 316 can assign the client device to a wave 1 radio of a hybrid low power network device in accessing a network.

In a specific implementation, the radio assignment engine 316 assigns a client device to a radio of a hybrid low power network device for accessing a network based on data characteristics of data transmitted to and/or received from the client device. The radio assignment engine 316 can use data characteristics data describing data characteristics of data transmitted to and/or received from a client device to assign the client device to a radio of a hybrid low power network device. For example, if data characteristics of data transmitted to a client indicate that the client device is receiving large amounts of data in accessing a network, then the radio assignment engine 316 can assign the client device to a wave 2 radio of a hybrid low power network device in accessing the network. In another example, if data characteristics of data transmitted to a client device indicate that the client device is receiving small amounts of data in accessing a network, then the radio assignment engine 316 can assign the client device to a wave 1 radio of a hybrid low power network device in accessing the network.

In a specific implementation, the radio assignment engine 316 assigns a client device to a radio of a hybrid low power network device for accessing a network based on network traffic characteristics of the hybrid low power network device. The radio assignment engine 316 can use traffic characteristics data describing network traffic characteristics a radio of a hybrid low power network device to assign a client device to a radio of the hybrid low power network device. For example, if network traffic characteristics of a hybrid low power network device indicate a wave 1 radio of the hybrid low power network device is not supporting any data streams and a wave 2 radio of the hybrid low power network device is supporting four data streams, then the radio assignment engine 316 can assign a client device to the wave 1 radio in accessing a network. In another example, if network traffic characteristics of a hybrid low power network device indicate that a wave 2 radio of the hybrid low power network device is not supporting any data streams and a wave 1 radio of the hybrid low power network device is supporting four data streams, then the radio assignment engine 316 can assign a client device to the wave 2 radio in accessing a network.

In a specific implementation, the radio assignment engine 316 assigns a client device to a radio of a hybrid low power network device for accessing a network based on a combination of device characteristics of the client device, data characteristics of data transmitted to and/or received from the client device, and/or network traffic characteristics of the hybrid low power network device. The radio assignment engine 316 can use device characteristics data, data characteristics data, and/or traffic characteristics data to assign a client device a radio of a hybrid low power network device for accessing a network. For example, if network traffic characteristics of a hybrid low power network device indicate a wave 1 radio of the hybrid low power network device is supporting 4 data streams and a wave 2 radio of the hybrid low power network device is only supporting 1 data stream and device characteristics of a client device indicate the client device is configured to receive data transmitted using MU-MIMO, then the radio assignment engine 316 can assign the client device to the wave 2 radio in accessing a network.

In a specific implementation, the radio assignment engine 316 assigns a client device to a radio of a hybrid low power network device for accessing a network based on power consumption of the hybrid low power network device. For example, if the hybrid low power network device is approaching a threshold power consumption level, e.g. 17 W, then the radio assignment engine 316 can assign client devices communicating with a wave 2 radio of the hybrid low power network device to a wave 1 radio of the hybrid low power network device. In various implementations, components of the hybrid low power network device can have specific threshold power consumption levels. For example, a wave 1 radio of a hybrid low power network device can have a threshold power consumption level of 4 W and a wave 2 radio of the hybrid low power network device can have a threshold power consumption level of 5 W. Depending upon implementation-specific or other considerations, the radio assignment engine 316 can assign a client device to radios of a hybrid low power network device for accessing a network based on power consumption levels of the radios of the hybrid low power network device. For example, if a wave 2 radio of a hybrid low power network device is consuming power at a level above a power consumption level of the wave 2 radio, then the radio assignment engine 316 can assign client devices communicating with the wave 2 radio to a wave 1 radio of the hybrid low power network device.

In an example of operation of the example system shown in FIG. 3, the device profiling engine 304 generates device characteristics data indicating device characteristics of a client device accessing a network through a hybrid low power network device. In the example of operation of the example system shown in FIG. 3, the device characteristics datastore 306 stores the device characteristics data generated by the device profiling engine 304. Further, in the example of operation of the example system shown in FIG. 3, the data profiling engine 308 generates data characteristics data indicating data characteristics of data transmitted to and from client devices in accessing the network through the hybrid low power network device. In the example of operation of the example system shown in FIG. 3, the data characteristics datastore 310 stores the data characteristics data generated by the data profiling engine 308. In the example of operation of the example system shown in FIG. 3, the traffic profiling engine 312 generates traffic characteristics data indicating network traffic characteristics of the hybrid low power network device in providing access to the network. In the example of operation of the example system shown in FIG. 3, the traffic characteristics datastore 314 stores the traffic characteristics data generated by the traffic profiling engine 312. Additionally, in the example of operation of the example system shown in FIG. 3, the radio assignment engine 316 assigns the client device to radios of the hybrid low power network device in accessing the network based on the device characteristics data, the data characteristics data, and the traffic characteristics data.

Figure 4:
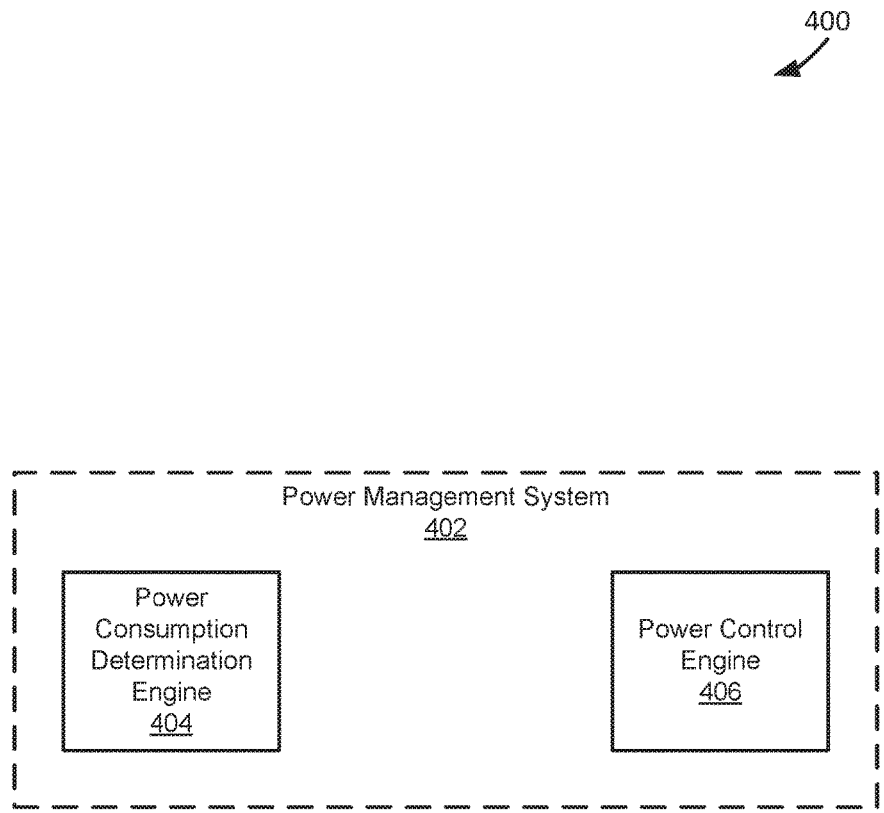
FIG. 4 depicts a diagram of an example of a system for managing power consumption in a hybrid low power network device.

FIG. 4 depicts a diagram 400 of an example of a system for managing power consumption in a hybrid low power network device. The system shown in FIG. 4 includes a power management system 402. The power management system 402 functions according to an applicable system for managing power consumption of a hybrid low power network device, such as the power management systems described in this paper. In managing power consumption of a hybrid low power network device, the power management system 402 can determine how much power is being consumed by components of the hybrid low power network device at any given time. For example, the power management system 402 can determine that a wave 1 radio of a hybrid low power network device is consuming 15 W while a wave 2 radio of the hybrid low power network device is consuming 17 W. Further, in managing power consumption of a hybrid low power network device, the power management system 402 can control operation of components of the hybrid low power network device according to power consumption levels of the hybrid low power network device. For example, the power management system 402 can disable an Ethernet port if the hybrid low power network device is consuming power above a threshold power consumption level.

In the example of FIG. 4, the power management system 402 includes a power consumption determination engine 404 and a power control engine 406. The power consumption determination engine 404 functions to determine power consumption levels of a hybrid low power network device. In various implementations, the power consumption determination engine 404 can determine power consumption levels of individual components in a hybrid low power network device. For example, the power management system 402 can determine that a wave 1 radio of a hybrid low power network device is consuming 15 W while a wave 2 radio of the hybrid low power network device is consuming 17 W. Depending upon implementation-specific or other considerations, the power consumption determination engine 404 can determine a power consumption level of a hybrid low power network device continuously in real-time, or at set intervals. For example the power consumption determination engine 404 can be configured to determine power consumption levels of a hybrid low power network device every minute.

The power control engine 406 functions to control operation of components of a hybrid low power network device according to power consumption levels of the hybrid low power network device. In controlling operation of components of a hybrid low power network device, the power control engine 406 can shut down components of the hybrid low power network device based on power consumption levels. For example, if a power consumption level of a hybrid low power network device is approaching a threshold power consumption level, then the power control engine 406 can disable an Ethernet port of the hybrid low power network device. Depending upon implementation-specific or other considerations, the power control engine 406 can control operation of components of a hybrid low power network device based on power consumption levels and network traffic characteristics of the hybrid low power network device. For example, if a power consumption level of a hybrid low power network device is approaching a threshold power consumption level and network traffic characteristics indicate a wave 1 radio of the hybrid low power network device is not supporting any data streams, then the power control engine 406 can turn off the wave 1 radio.

In an example of operation of the example system shown in FIG. 4, the power consumption determination engine 404 determines power consumption levels of a hybrid low power network device. In the example of operation of the example system shown in FIG. 4, the power control engine 406 controls operation of components of the hybrid low power network device based on the power consumption levels determined by the power consumption determination engine 404.

Figure 5:
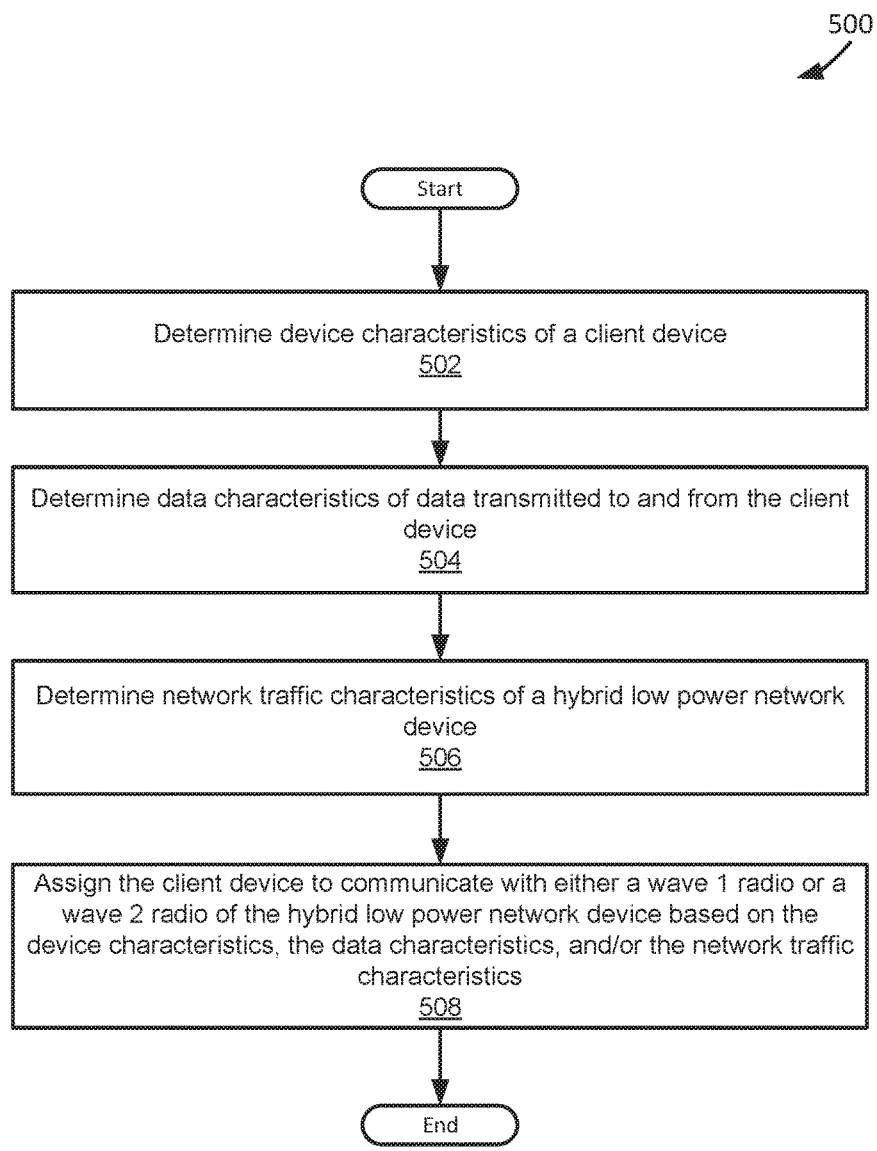
FIG. 5 depicts a diagram of a flowchart of an example method for assigning a client device to communicate with a wave 1 radio or a wave 2 radio of a hybrid low power network device in accessing a network.

FIG. 5 depicts a diagram of a flowchart 500 of an example method for assigning a client device to communicate with a wave 1 radio or a wave 2 radio of a hybrid low power network device in accessing a network. The flowchart 500 begins at module 502, where device characteristics of a client device are determined. An applicable engine for determining device characteristics, such as the device profiling engines described in this paper, can determine device characteristics of a client device. For example, it can be determined whether a client device is configured to communicate over a wireless communication channel according to SU-MIMO or MU-MIMO.

The flowchart 500 continues to module 504, where data characteristics of data transmitted to and/or from the client device is determined. An applicable engine for determining data characteristics, such as the data profiling engines described in this paper, can determined data characteristics of data transmitted to and/or from the client device. For example, it can be determined if voice streaming video data is being transmitted to the client device.

The flowchart 500 continues to module 506, where network traffic characteristics of a hybrid low power network device are determined. An applicable engine for determining network traffic characteristics, such as the traffic profiling engines described in this paper. For example, it can be determined how many data streams each radio of a hybrid low power network device are supporting.

The flowchart 500 continues to module 508, where the client device is assigned to communicate with either a wave 1 radio or a wave 2 radio of the hybrid low power network device based on the device characteristics, the data characteristics, and/or the network traffic characteristics. An applicable engine for assigning a client device to a radio, such as the radio assignment engines described in this paper, can assign the client device to communicate with either a wave 1 radio or a wave 2 radio of the hybrid low power network device based on the device characteristics, the data characteristics, and/or the network traffic characteristics. Depending upon implementation-specific or other considerations, the client device can already be assigned to a radio of the hybrid low power network device and communicating using the radio before being reassigned to a new radio or assigned again to the same radio at module 508.

Figure 6:
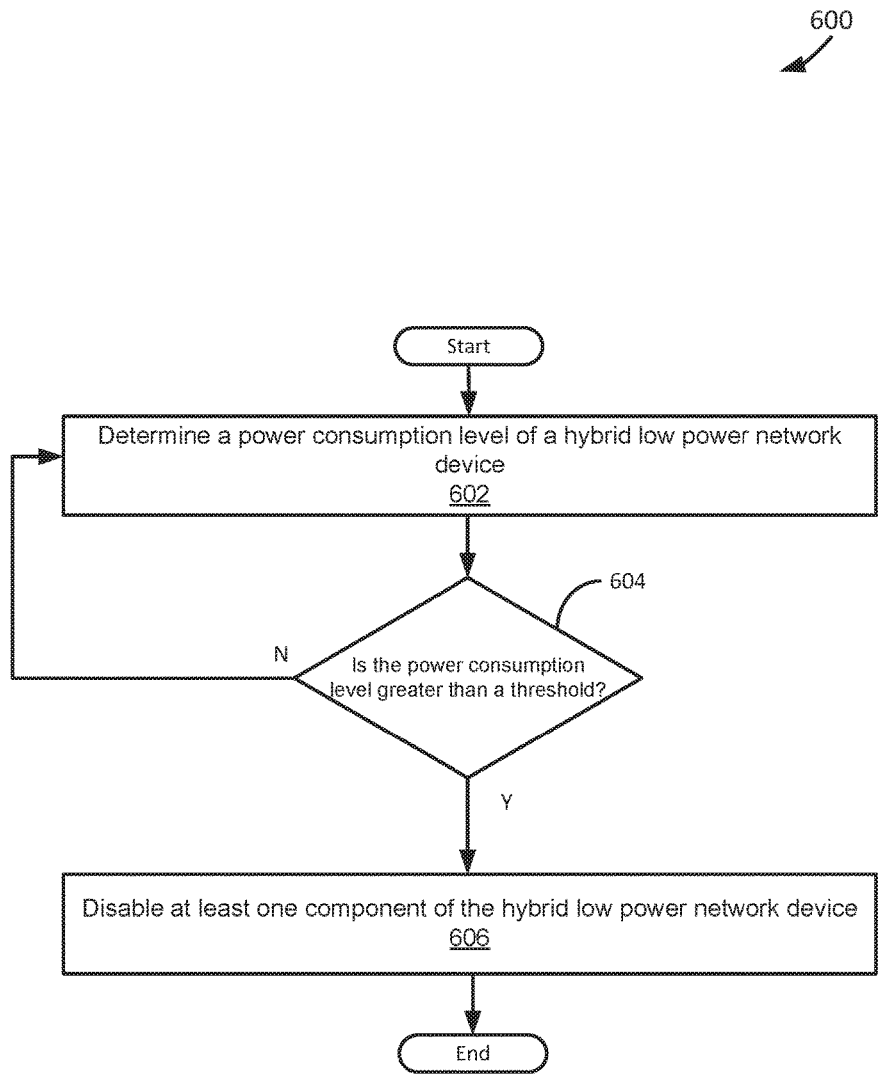
FIG. 6 depicts a diagram of a flowchart of an example method for managing power consumption of a hybrid low power network device in accessing a network.

FIG. 6 depicts a diagram of a flowchart 600 of an example method for managing power consumption of a hybrid low power network device in accessing a network. The flowchart 600 begins at module 602, where a power consumption level of a hybrid low power network device is determined. An applicable engine for determining power consumption levels, such as the power consumption determination engines described in this paper. Depending upon implementation-specific or other considerations, power consumption levels of individual components can be determined to determine an overall power consumption level of the hybrid low power network device. For example, a power consumption level of a wave 1 radio and a power consumption level of a wave 2 radio can be determined to determine an overall power consumption level of the hybrid low power network device.

The flowchart 600 continues to decision point 604, where it is determined if the power consumption level of the hybrid low power network device is greater than a threshold power consumption level. An applicable engine for comparing power consumption levels, such as the power control engines described in this paper, can determine if a the power consumption level is greater than a threshold power consumption level. Depending upon implementation-specific or other considerations, it can be determined if a power consumption level of the hybrid low power network device or components of the hybrid low power network device are greater than a threshold power consumption level.

The flowchart 600 continues to module 606, where at least one component of the hybrid low power network device is disabled. An applicable engine for disabling components of the hybrid low power network device, such as the power control engines described in this paper, can disable at least one component of the hybrid low power network device. Depending upon implementation-specific or other considerations, a component of the hybrid low power network device is disabled. For example, if a power consumption level of the hybrid low power network device is greater than a threshold power consumption level, then an Ethernet port of the hybrid low power network device can be disabled. In another example, if a power consumption level of a wave 2 radio of the hybrid low power network device is greater than a threshold power consumption level, then the wave 2 radio can be disabled, or client devices supported by the wave 2 radio can be assigned to a wave 1 radio of the hybrid low power network device.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

I claim:

1. A hybrid low power network device comprising:
   a wave 1 radio configured to provide client devices wireless access to a network using single-user multi-input multi-output (SU-MIMO);
   a wave 2 radio configured to provide the client devices wireless access to the network using multi-user multi-input multi-output (MU-MIMO);
   a radio management system configured to assign the client devices to the wave 1 radio or the wave 2 radio for communicating over wireless communication channels in accessing the network;
   first and second network ports, wherein at least one of the first and second network ports are configured to provide power to the hybrid low power network device and allow at least one of the wave 1 radio and the wave 2 radio to communicate with the network;
   a power consumption determination engine configured to determine a power consumption level of the hybrid low power network device;
   a power control engine configured to disable at least one component of the hybrid low power network device based on the power consumption level of the hybrid low power network device.

2. The hybrid low power network device of claim 1, wherein the power control engine is further configured to determine individual power levels of one or more components of the hybrid low power network device, and the power consumption level of the hybrid low power network device is based on the individual power levels of the one or more components of the hybrid low power network device.

3. The hybrid low power network device of claim 1, wherein the power control engine is further configured to disable a particular network port of the first and second network ports based on the power consumption level of the hybrid low power network device.

4. The hybrid low power network device of claim 1, further comprising:
   a traffic profiling engine configured to determine network traffic characteristics of the hybrid low power network device;
   a radio assignment engine configured to assign the client devices to either the wave 1 radio or the wave 2 radio for communicating over the wireless communication channels in accessing the network based on the network traffic characteristics of the hybrid low power network device.

5. The hybrid low power network device of claim 4, wherein the power control engine is further configured to disable a particular network port of the first and second network ports based on the power consumption level of the hybrid low power network device and the network traffic characteristics of the hybrid low power network device.

6. The hybrid low power network device of claim 1, wherein in operation the hybrid low power network device is configured to operate at a power consumption level under 17 watts (W) in providing the client devices wireless access to the network.

7. The hybrid low power network device of claim 1, wherein the wave 1 radio is configured to selectively operate within a 2.4 GHz frequency band or a 5 GHz frequency band.

8. The hybrid low power network device of claim 1, wherein the wave 2 radio is configured to operate within a 5 GHz frequency band.

9. The hybrid low power network device of claim 1, wherein the hybrid low power network device is configured to operate at a power consumption level at or beneath a power over Ethernet limit.

10. The hybrid low power network device of claim 1, further comprising:
   a device profiling engine configured to determine device characteristics of the client devices;
   a radio assignment engine configured to assign the client devices to either the wave 1 radio or the wave 2 radio for communicating over the wireless communication channels in accessing the network based on the device characteristics of the client devices.

11. The hybrid low power network device of claim 1, further comprising:
a data profiling engine configured to determine data characteristics of data transmitted to and from the client devices by the hybrid low power network device;
a radio assignment engine configured to assign the client devices to either the wave 1 radio or the wave 2 radio for communicating over the wireless communication channels in accessing the network based on the data characteristics of the data transmitted to and from the client devices.

12. The hybrid low power network device of claim 1, further comprising:
a device profiling engine configured to determine device characteristics of the client devices;
a data profiling engine configured to determine data characteristics of data transmitted to and from the client devices by the hybrid low power network device;
a traffic profiling engine configured to determine network traffic characteristics of the hybrid low power network device;
a radio assignment engine configured to assign the client devices to either the wave 1 radio or the wave 2 radio for communicating over the wireless communication channels in accessing the network based on a combination of at least two of the device characteristics of the client devices, the data characteristics of the data transmitted to and from the client devices, and the network traffic characteristics of the hybrid low power network device.

13. The hybrid low power network device of claim 1, further comprising a radio assignment engine configured to assign the client devices to either the wave 1 radio or the wave 2 radio for communicating over the wireless communication channels in accessing the network based on power consumption levels of one or more components of the hybrid low power network device.

14. A method comprising:
determining a radio of a hybrid low power network device to assign client devices to in wirelessly accessing a network, the hybrid low power network device including a wave 1 radio configured to provide the client devices wireless access to the network using single-user multi-input multi-output (SU-MIMO), a wave 2 radio configured to provide the client devices wireless access to the network using multi-user multi-input multi-output (MU-MIMO), and first and second network ports, wherein at least one of the first and second network ports are configured to provide power to the hybrid low power network device and allow at least one of the wave 1 radio and the wave 2 radio to communicate with the network;
determining a power consumption level of the hybrid low power network device;
disabling at least one component of the hybrid low power network device based on the power consumption level of the hybrid low power network device.

15. The method of claim 14, further comprising determining individual power levels of one or more components of the hybrid low power network device, the power consumption level of the hybrid low power network device being based on the individual power levels of the one or more components of the hybrid low power network device.

16. The method of claim 14, further comprising disabling a particular network port of the first and second network ports based on the power consumption level of the hybrid low power network device.

17. The method of claim 14, further comprising:
determining network traffic characteristics of the hybrid low power network device;
disabling a particular network port of the first and second network ports based on the power consumption level of the hybrid low power network device and the network traffic characteristics of the hybrid low power network device.

18. The method of claim 14, wherein the hybrid low power network device is configured to operate at a power consumption level under 17 watts (W) in providing the client devices wireless access to the network.

19. The method of claim 14, further comprising:
determining data characteristics of data transmitted to and from the client devices by the hybrid low power network device;
assigning the client devices to either the wave 1 radio or the wave 2 radio for communicating over wireless communication channels in accessing the network based on the data characteristics of the data transmitted to and from the client devices.

* * * * *